United States Patent
Iriyama

(10) Patent No.: US 12,382,221 B2
(45) Date of Patent: Aug. 5, 2025

(54) SIGNAL PROCESSING SYSTEM, SIGNAL PROCESSING DEVICE, AND SIGNAL PROCESSING METHOD

(71) Applicant: YAMAHA CORPORATION, Hamamatsu (JP)

(72) Inventor: Tatsuya Iriyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 275 days.

(21) Appl. No.: 18/191,036

(22) Filed: Mar. 28, 2023

(65) Prior Publication Data

US 2023/0239621 A1     Jul. 27, 2023

Related U.S. Application Data

(63) Continuation of application No. PCT/JP2020/037409, filed on Oct. 1, 2020.

(51) Int. Cl.
*H04R 3/12* (2006.01)
*G06F 3/16* (2006.01)

(52) U.S. Cl.
CPC ............... *H04R 3/12* (2013.01); *G06F 3/165* (2013.01)

(58) Field of Classification Search
CPC .... H04R 3/12; H04R 27/00; H04R 2227/003; G06F 3/165; G10K 15/02

(Continued)

(56) References Cited

U.S. PATENT DOCUMENTS 8,120,637 B2 * 2/2012 Baird ................. H04N 21/4341
                                                        348/14.09
9,497,542 B2 * 11/2016 Tanaka ................... H04R 3/005
(Continued)

FOREIGN PATENT DOCUMENTS

| JP | 2004094683 A | 3/2004 |
| JP | 2007277492 A | 10/2007 |
| JP | 2016146544 A | 8/2016 |

OTHER PUBLICATIONS

Office Action issued in Chinese Appln. No. 202080105235.0 mailed Aug. 9, 2024. English machine translation provided.

(Continued)

*Primary Examiner* — Xu Mei
(74) *Attorney, Agent, or Firm* — ROSSI, KIMMS & McDOWELL LLP

(57) ABSTRACT

A signal processing system is a system in which a plurality of devices including at least a first terminal device and a second terminal device that receive streaming data are connected to a communication system capable of communicating with the plurality of devices. The signal processing system includes: a receiving unit that receives a designation of first sound data from the first terminal device that received the streaming data and a designation of second sound data from the second terminal device that received the streaming data; a signal processing unit that obtains first sound data corresponding to the received designation of first sound data and second sound data corresponding to the received designation of second sound data, and generates a third sound signal in which a first sound signal corresponding to the first sound data and a second sound signal corresponding to the second sound data are mixed.

11 Claims, 10 Drawing Sheets

(58) Field of Classification Search
USPC .............................................. 381/77–79, 119
See application file for complete search history.

(56) References Cited

U.S. PATENT DOCUMENTS

| | | | |
|---|---|---|---|
| 2005/0052285 A1* | 3/2005 | Iriyama | H04R 29/007 379/106.01 |
| 2012/0155671 A1* | 6/2012 | Suzuki | H04M 9/08 381/77 |
| 2018/0279063 A1* | 9/2018 | Sun | H04M 3/565 |

OTHER PUBLICATIONS

International Search Report issued in Intl. Appln. No. PCT/JP2020/037409 mailed Dec. 22, 2020. English translation provided.
Written Opinion issued in Intl. Appln. No. PCT/JP2020/037409 mailed Dec. 22, 2020.
English translation of Written Opinion issued in Intl. Appln. No. PCT/JP2020/037409 mailed on Dec. 22, 2020, previously cited in IDS filed Mar. 28, 2023.

* cited by examiner

| SOUND DATA NAME | SOUND DATA | ... |
|---|---|---|
| APPLAUSE 01 | clap-01.wav | ... |
| APPLAUSE 02 | clap-02.wav | ... |
| ... | ... | ... |

| DATE/TIME | TERMINAL INFORMATION | SOUND DATA NAME | ... |
|---|---|---|---|
| 2020/7/20 10:00:00 | TERMINAL A | APPLAUSE 01 | ... |
| 2020/7/20 10:00:15 | TERMINAL B | APPLAUSE 02 | ... |
| ... | ... | ... | ... |

SIGNAL PROCESSING SYSTEM, SIGNAL PROCESSING DEVICE, AND SIGNAL PROCESSING METHOD

CROSS-REFERENCE TO RELATED APPLICATIONS

The present application is a continuation application of International Application No. PCT/JP2020/037409, filed Oct. 1, 2020, the contents of which are incorporated herein by reference.

BACKGROUND

Technical Field

The present disclosure relates to a signal processing system, a signal processing device, and a signal processing method.

Background Art

In recent years, communication systems such as electronic conferencing systems using web applications are known (see Japanese Patent Application Publication No. 2007-277492). In such a communication system, for example, streaming data of a lecture, a presentation, or the like can be delivered to a plurality of users over a network, and the plurality of users can therefore communicate with each other.

SUMMARY

However, in a communication system such as that described above, when streaming data of a presentation or the like is delivered to users without communicating sound signals or the like from users on the delivery destination side, the delivery source side may not be able to know responses, such as the reactions, of the users on the delivery destination side, and may therefore find it difficult to talk.

It has therefore been difficult to properly know the reactions of users on the delivery destination side when delivering streaming data in a communication system such as that described above.

Meanwhile, some communication systems are capable of displaying a picture representing applause by pressing an "applause" button. Such pictures lack a sense of immersion, however.

The present disclosure has been achieved to solve the above-described problem. An object of the present disclosure is to provide a signal processing system, a signal processing device, and a signal processing method that, when delivering streaming data, make it possible to appropriately know reactions of a user on a delivery destination side. A further object is to provide a signal processing system, a signal processing device, and a signal processing method that provide users with a sense of immersion.

To solve the above-described problem, one aspect of the present disclosure is a signal processing system in which a plurality of devices including at least a first terminal device and a second terminal device that receive streaming data are connected to a communication system capable of communicating with the plurality of devices. The signal processing system includes: a receiving unit that receives a designation of first sound data from the first terminal device that received the streaming data and a designation of second sound data from the second terminal device that received the streaming data; a signal processing unit that obtains first sound data corresponding to the received designation of first sound data and second sound data corresponding to the received designation of second sound data, and generates a third sound signal in which a first sound signal corresponding to the first sound data and a second sound signal corresponding to the second sound data are mixed; and a transmission unit that transmits the third sound signal to the communication system via a communication path connecting the communication system and the first terminal device.

DETAILED DESCRIPTION OF THE EMBODIMENTS

A signal processing system, a signal processing device, and a signal processing method according to embodiments of the present disclosure will be described hereinafter with reference to the drawings.

Embodiment 1

Figure 1:
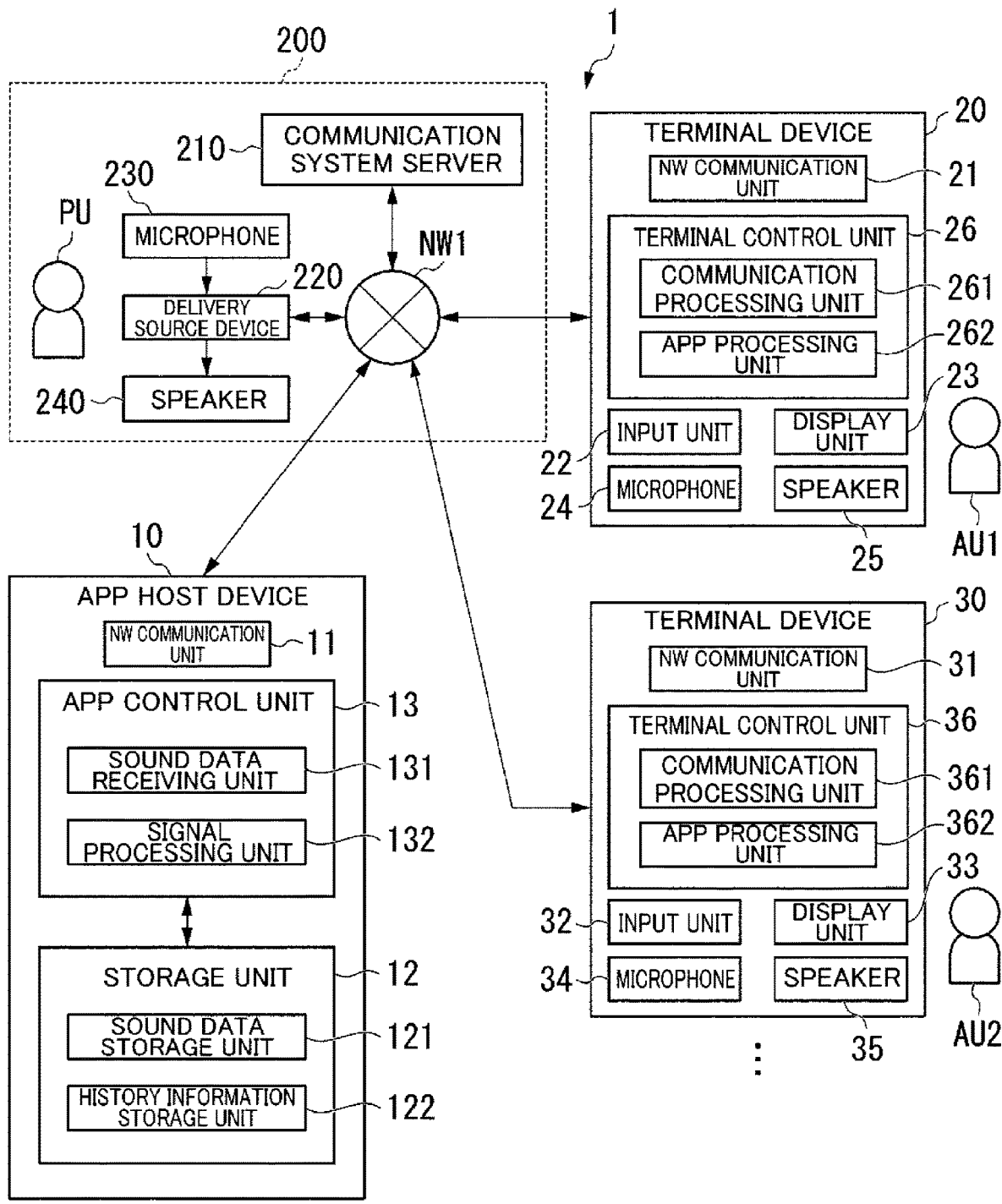
FIG. 1 is a block diagram illustrating an example of a signal processing system according to Embodiment 1.

FIG. 1 is a block diagram illustrating an example of a signal processing system 1 according to the present embodiment.

The signal processing system 1 is a system that is connected to a communication system 200 and a plurality of devices including at least a terminal device 20 and a terminal device 30, and includes an app host device 10.

The communication system 200 is a system that communicates among the plurality of devices over a communication line, and is, for example, an electronic conferencing system, a video delivery system, or the like. The communication system 200 is connected to the signal processing system 1 over a network NW1, for example. The present embodiment will describe an example in which, in the communication system 200, a distributor PU distributes streaming data, such as a presentation or a lecture, to the terminal device 20 and the terminal device 30 over the network NW1.

The communication system 200 includes a communication system server 210, a delivery source device 220, a microphone 230, and a speaker 240, and can be connected to the plurality of devices including at least the terminal device 20 and the terminal device 30.

The communication system server 210 is a server device that manages the communication system 200, for example. The communication system server 210 receives information such as streaming data, image data, sound signals, and the like from various devices over the network NW1, and transmits (delivers) information such as the streaming data to connected devices over the network NW1.

The delivery source device 220 is, for example, a terminal device through which the distributor PU delivers streaming data of a presentation, a lecture, or the like in real time. The delivery source device 220 is connected to the microphone 230 and the speaker 240. It is also assumed that the delivery source device 220 includes, for example, a camera (not shown) for live delivery of streaming data. Here, the distributor PU is, for example, a user of the communication system 200 that delivers the streaming data. The delivery source device 220 transmits the streaming data to the communication system server 210 over the network NW1.

The microphone 230 collects sound in the periphery of the delivery source device 220 and outputs a sound signal to the delivery source device 220.

The speaker 240 outputs a sound signal delivered from the communication system server 210. The speaker 240 also outputs, for example, a sound signal based on sound data, such as applause, designated by the terminal device 20 and the terminal device 30, which will be described later.

The terminal device 20 (an example of a first terminal device) is connected to the communication system 200 by a communication line, and streaming data is delivered thereto from the communication system 200. The terminal device 20 is, for example, a personal computer, a tablet terminal device, a smartphone, or the like. The terminal device 20 receives the streaming data delivered from the delivery source device 220 through the communication system 200, and outputs a video signal and a sound signal based on the streaming data to a user AU1.

Additionally, for example, the terminal device 20 designates sound data to the app host device 10 by executing an application (sometimes called an "app" hereinafter) for transmitting sound data, such as applause, to the delivery source device 220.

The terminal device 20 also includes an NW (network) communication unit 21, an input unit 22, a display unit 23, a microphone 24, a speaker 25, and a terminal control unit 26.

The NW communication unit 21 is an interface unit capable of connecting to the network NW1, and performs communication between the communication system 200 and the app host device 10 over the network NW1.

The input unit 22 is, for example, an input device such as a keyboard, a mouse, a touch panel, or the like, and accepts various inputs from the user AU1. The input unit 22 is used, for example, to perform various operations when using the communication system 200, designate sound data such as applause, and the like.

The display unit 23 is a display device such as a liquid crystal display, for example, and displays images and video delivered by the communication system 200, images of various types of operating screens, and the like.

The microphone 24 (an example of a sound collecting unit) collects sound from the periphery of the terminal device 20, generates a sound signal, and outputs that sound signal to the terminal control unit 26. Note that the microphone 24 may be a built-in microphone built into the terminal device 20, or may be an external microphone.

The speaker 25 outputs a sound signal of sound data delivered by the communication system 200 or the like. Note that the speaker 25 may be a built-in speaker built into the terminal device 20, or may be an external speaker.

The terminal control unit 26 is, for example, a processor including a CPU (Central Processing Unit) and the like, and controls the terminal device 20. The terminal control unit 26 includes a communication processing unit 261 and an app processing unit 262.

The communication processing unit 261 connects to the communication system 200 through the NW communication unit 21 and communicates with other devices. The communication processing unit 261 receives the streaming data delivered by the delivery source device 220 through the NW communication unit 21, causes the display unit 23 to display the video signal based on the streaming data, and causes the speaker 25 to output the sound signal based on the streaming data.

Additionally, the communication processing unit 261 mixes a sound signal (a mixed sound signal), which will be described later, received from the app host device 10 through the NW communication unit 21, with sound data collected by a microphone 34, and transmits the resulting signal to the communication system 200 through the NW communication unit 21.

The app processing unit 262 connects to the app host device 10 through the NW communication unit 21 and executes processing for designating sound data such as applause. The app processing unit 262 causes the display unit 23 to display an image of a designation menu screen transmitted from the app host device 10. Here, the designation menu screen is, for example, a menu screen for selecting and designating sound data to be transmitted to the communication system 200 from among a plurality of pieces of sound data. Additionally, the app processing unit 262 transmits, through the NW communication unit 21 to the app host device 10, designation information of the sound data designated by the user AU1 through the designation menu screen using the input unit 22.

The terminal device 30 (an example of a second terminal device) is connected to the communication system 200 by a communication line, and streaming data is delivered thereto from the communication system 200. The terminal device 30 is, for example, a personal computer, a tablet terminal device, a smartphone, or the like. The terminal device 30 receives the streaming data delivered from the delivery source device 220 through the communication system 200, and outputs a video signal and a sound signal based on the streaming data to a user AU2.

For example, the terminal device 30 designates sound data to the app host device 10 by executing an application for transmitting sound data, such as applause, to the delivery source device 220. The terminal device 30 includes an NW communication unit 31, an input unit 32, a display unit 33, the microphone 34, a speaker 35, and a terminal control unit 36.

The NW communication unit 31 has a configuration and functions similar to those of the NW communication unit 21. The input unit 32 has a configuration and functions similar to those of the input unit 22. The display unit 33 has a configuration and functions similar to those of the display unit 23. The microphone 34 has a configuration and functions similar to those of the microphone 24. The speaker 35 has a configuration and functions similar to those of the speaker 25.

The terminal control unit 36 has a configuration and functions similar to those of the terminal control unit 26. The terminal control unit 36 includes a communication processing unit 361 and an app processing unit 362.

The communication processing unit 361 has a configuration and functions similar to those of the communication processing unit 261.

The app processing unit 362 has a configuration and functions similar to those of the app processing unit 262.

Note that in the present embodiment, the terminal device 20 transmits the mixed sound signal generated by the app host device 10 to the communication system 200, whereas the terminal device 30 does not transmit a mixed sound signal to the communication system 200.

Furthermore, although FIG. 1 illustrates a case where there is one terminal device 30, the signal processing system 1 may include a plurality of terminal devices 30.

The app host device 10 is a server device connected to the network NW1, and is a web server providing a web site for designating sound data such as applause, for example. The app host device 10 uses the web site for designating sound data to generate a mixed sound signal in which sound data designated through the terminal device 20 and the terminal device 30 is mixed. The app host device 10 transmits the mixed sound signal to the communication system 200 over a connection line of the terminal device 20.

The app host device 10 includes an NW communication unit 11, a storage unit 12, and an app control unit 13.

The NW communication unit 11 (an example of a transmission unit) is an interface unit that can connect to the network NW1, and performs communication between the terminal device 20 and the terminal device 30 over the network NW1.

The storage unit 12 stores various types of information used by the app host device 10. The storage unit 12 includes a sound data storage unit 121 and a history information storage unit 122.

The sound data storage unit 121 stores sound data that can be designated from the terminal device 20 and the terminal device 30. An example of the data in the sound data storage unit 121 will be described with reference to FIG. 2.

Figures 2, 3, 4:
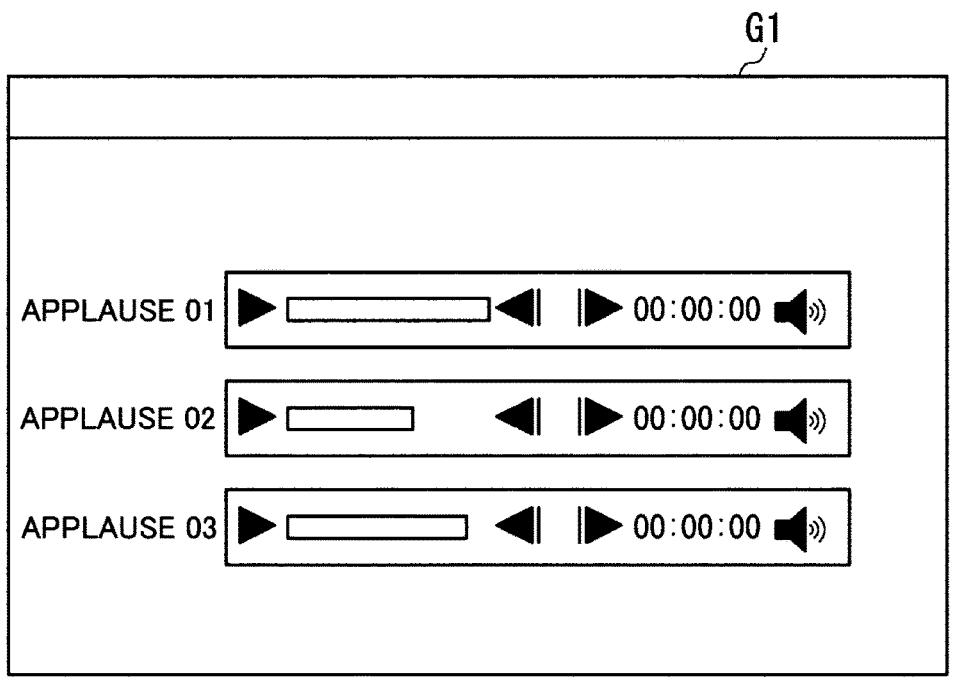
FIG. 2 is a diagram illustrating an example of data in a sound data storage unit according to Embodiment 1.
FIG. 3 is a diagram illustrating an example of data in a history information storage unit according to Embodiment 1.
FIG. 4 is a diagram illustrating an example of a designation menu screen for designating sound data according to Embodiment 1.

FIG. 2 is a diagram illustrating an example of the data in the sound data storage unit 121 according to the present embodiment.

The sound data storage unit 121 stores sound data names in association with sound data. Here, the sound data name is the name of sound data that can be designated in the app host device 10, and is identification information that identifies the sound data. Moreover, the sound data indicates a filename of the sound data. In this manner, the sound data storage unit 121 stores identification information of the sound data in association with the sound data.

For example, the example illustrated in FIG. 2 indicates that "clap-01.wav" is stored in the sound data storage unit 121 as sound data having a sound data name of "applause 01". Additionally, "clap-02.wav" is stored in the sound data storage unit 121 as sound data having a sound data name of "applause 02".

Note that in addition to sound data of different types of applause, the sound data may be, for example, voice data such as "wow", "I can't hear anything", or the like, sound data of a bell indicating the ending time of a presentation, or the like.

Returning to the descriptions of FIG. 1, the history information storage unit 122 stores history information of the sound data designated from the terminal device 20 and the terminal device 30. An example of the data in the history information storage unit 122 will be described with reference to FIG. 3.

FIG. 3 is a diagram illustrating an example of data in the history information storage unit 122 according to the present embodiment.

The history information storage unit 122 stores a date/time, terminal information, and a sound data name in association with each other. Here, the date/time indicates the date and time when the sound data was designated by the terminal device 20 and the terminal device 30, and the terminal information indicates identification information of the terminal device 20 and the terminal device 30. Additionally, the sound data name indicates a sound data name designated by the terminal device 20 and the terminal device 30.

The example illustrated in FIG. 3 indicates that sound data having a sound data name "applause 01" has been designated from "terminal A" on a date/time of "2020/7/20 10:00:00". Additionally, sound data having a sound data name "applause 02" has been designated from "terminal B" on a date/time of "2020/7/20 10:00:15".

Returning again to the description of FIG. 1, the app control unit 13 is, for example, a processor including a CPU and the like, and controls the app host device 10. The app control unit 13 includes a sound data receiving unit 131 and a signal processing unit 132.

The sound data receiving unit 131 (an example of a receiving unit) receives the designation of sound data from the terminal device 20 and the terminal device 30. The sound data receiving unit 131 receives, for example, a designation of first sound data obtained from the terminal device 20 that has received the streaming data, and a designation of second sound data obtained from the terminal device 30 that has received the streaming data.

For example, the sound data receiving unit 131 causes the terminal device 20 and the terminal device 30 to display the designation menu screen for designating the sound data, and receives the designations of the sound data. For example, the sound data receiving unit 131 transmits an image of the designation menu screen, such as that illustrated in FIG. 4, to the terminal device 20 and the terminal device 30 over the NW communication unit 11 and causes that image to be displayed.

FIG. 4 is a diagram illustrating an example of the designation menu screen for designating sound data according to the present embodiment.

As illustrated in FIG. 4, the sound data receiving unit 131 causes the terminal device 20 and the terminal device 30 to display an image of a designation menu screen including sound data information indicating sound data that can be designated and playback bars indicating a playback time (a playback period) of each piece of sound data in a visual manner (a designation menu image G1). Here, the playback bar has a length corresponding to the playback time (the playback period). Note that the playback bars may be of the same length, and the speed at which the playback bar moves (e.g., the inverse of the playback time or the like) may be changed in accordance with the playback time (the playback period).

Users AU1 to AU3 designate the sound data by operating the input unit 22 of the terminal device 20 or the input unit 32 of the terminal device 30 and pressing (clicking) the part of the sound data in the designation menu image G1.

When the designation of sound data is received from the terminal device 20 and the terminal device 30, the sound data receiving unit 131 stores the date/time, the terminal information, and the sound data name in the history information storage unit 122 in association with each other, as illustrated in FIG. 3.

Additionally, when a designation of sound data has been received, the sound data receiving unit 131 obtains the designated sound data. In this case, the sound data receiving unit 131 obtains the designated sound data from the sound data storage unit 121. The sound data receiving unit 131 transmits a designated sound signal based on the designated sound data obtained to the terminal device, among the terminal device 20 and the terminal device 30, that is the source of the designation, and causes the terminal device that is the source of the designation to output the designated sound signal.

The signal processing unit 132 obtains, from the sound data storage unit 121, the sound data for which the sound data receiving unit 131 received the designation from the terminal device 20 and the terminal device 30, and generates the mixed sound signal by mixing the sound signals that are based on the designated plurality of pieces of sound data. For example, the signal processing unit 132 obtains the first sound data designated by the terminal device 20 and the second sound data designated by the terminal device 30 from the sound data storage unit 121, and generates a mixed sound signal (a third sound signal) in which a first sound signal based on the first sound data and a second sound signal based on the second sound data are mixed.

Note that the signal processing unit 132 obtains the designation of the sound data received by the sound data receiving unit 131 by reading out the history information stored in the history information storage unit 122. The signal processing unit 132 obtains the sound data name in the history information stored in the history information storage unit 122, and obtains the sound data corresponding to the obtained sound data name from the sound data storage unit 121.

Additionally, when the sound data receiving unit 131 has received the designation of an overlapping plurality of pieces of sound data from the same terminal device among the terminal device 20 and the terminal device 30, the signal processing unit 132 generates a mixed sound signal (the third sound signal) in which a plurality of sound signals that are based on the designated plurality of pieces of sound data are mixed. In this case, the signal processing unit 132 obtains the designated plurality of pieces of sound data from the sound data storage unit 121, converts the plurality of pieces of sound data into a plurality of sound signals, and generates the mixed sound signal by mixing the plurality of sound signals.

The signal processing unit 132 transmits the generated mixed sound signal (the third sound signal) to the terminal device 20 through the NW communication unit 11. The NW communication unit 11 transmits the mixed sound signal (the third sound signal) to the communication system 200 over a communication line to which the communication system 200 and the terminal device 20 are connected.

The signal processing system 1 according to the present embodiment will be described next with reference to the drawings.

Figure 5:
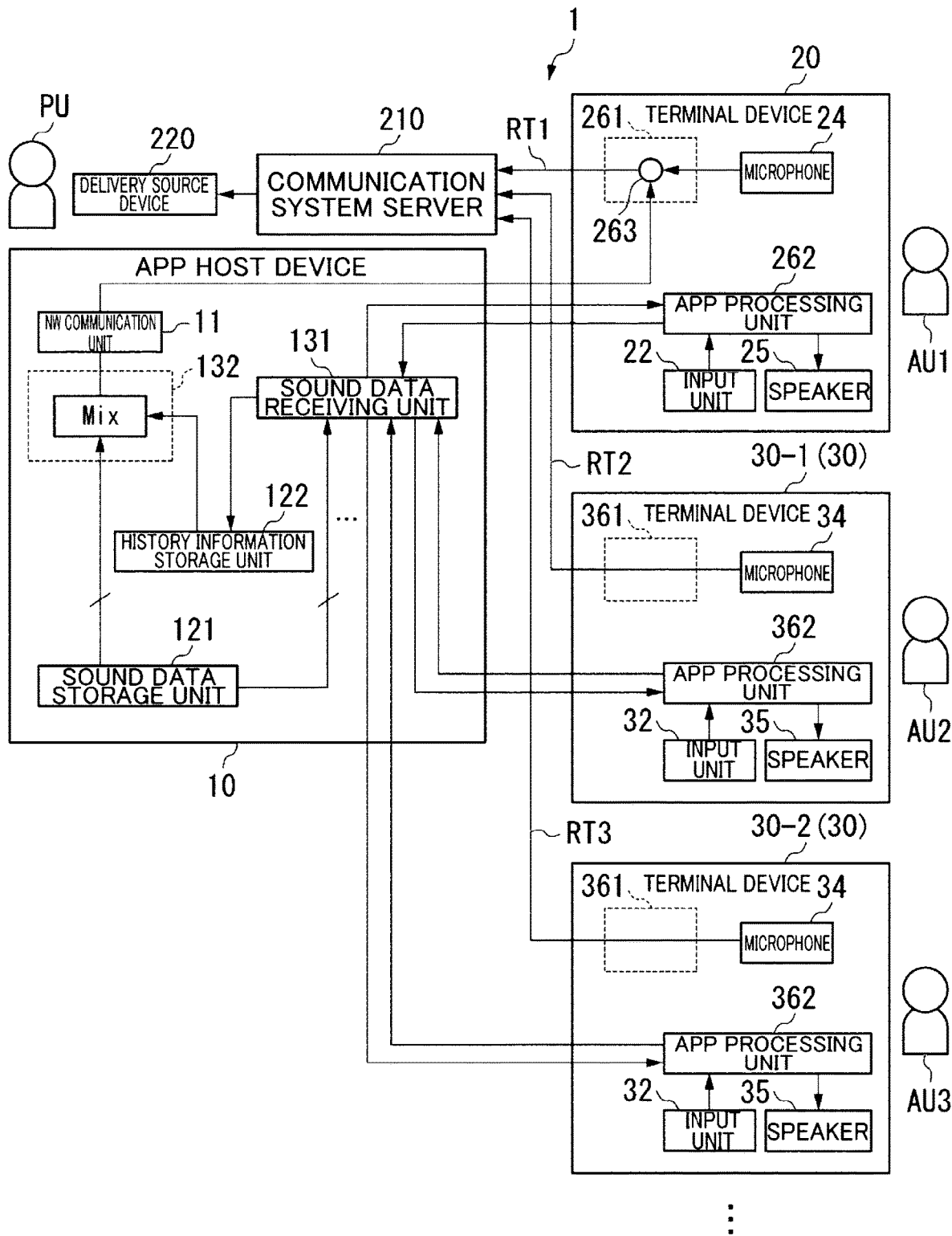
FIG. 5 is a diagram illustrating an example of operations by the signal processing system according to Embodiment 1.
Figure 6:
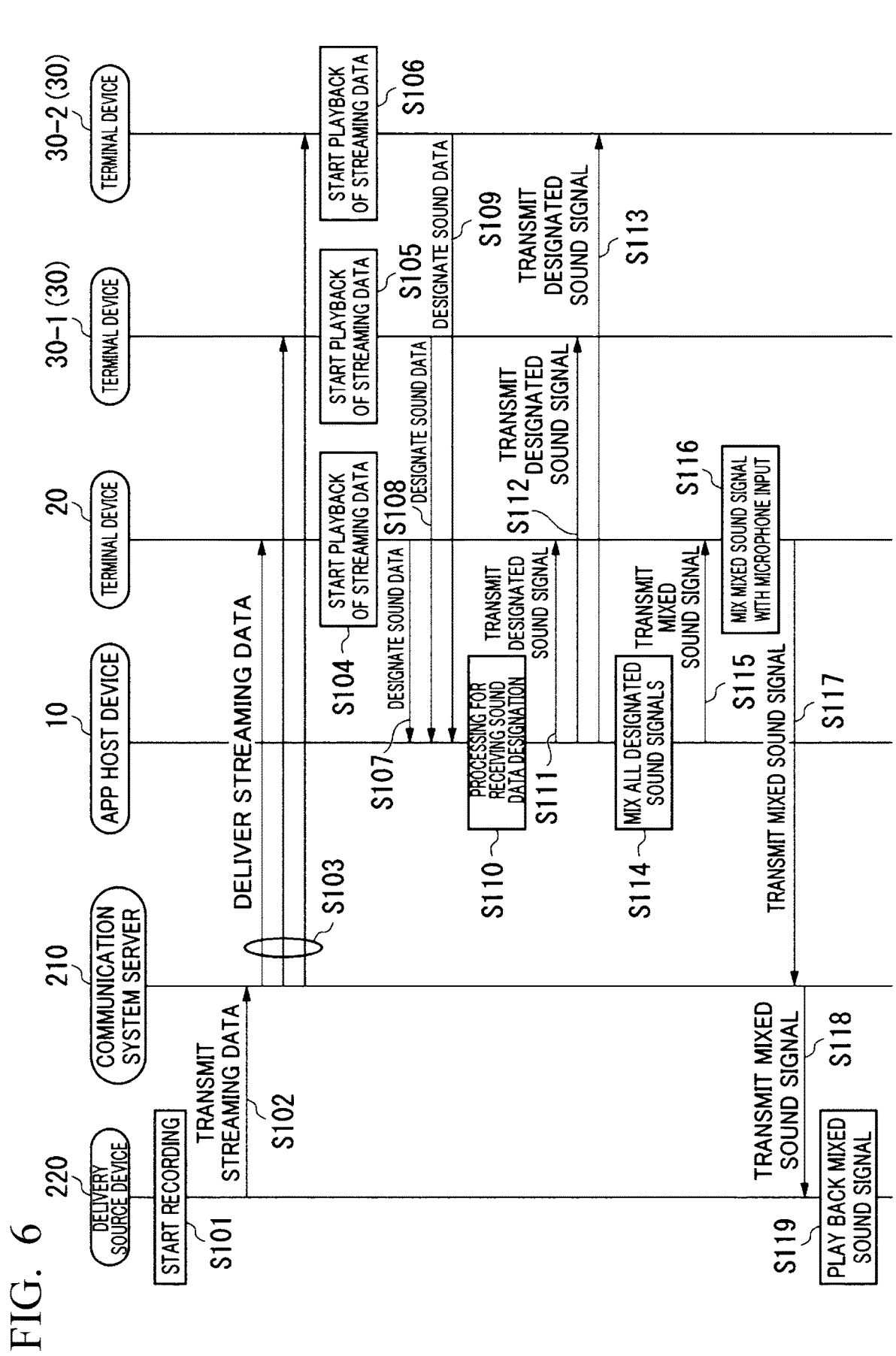
FIG. 6 is a diagram illustrating an example of operations for designating sound data from a plurality of terminal devices of the signal processing system according to Embodiment 1.

FIG. 5 is a diagram illustrating an example of operations by the signal processing system 1 according to the present embodiment. FIG. 6, meanwhile, is a diagram illustrating an example of operations for designating sound data from a plurality of terminal devices (20 and 30) of the signal processing system 1 according to the present embodiment.

Here, a case where one terminal device 20 and two terminal devices 30 (30-1 and 30-2) are connected to the communication system 200 and the signal processing system 1 is illustrated as an example. The user AU1 indicates the user of the terminal device 20 viewing the streaming data delivered from the delivery source device 220, and the user AU2 indicates the user of the terminal device 30-1 viewing the streaming data delivered from the delivery source device 220. A user AU3 indicates the user of the terminal device 30-2 viewing the streaming data delivered from the delivery source device 220.

The terminal device 20 is connected to the communication system 200 by a communication line RT1, and the terminal device 30-1 is connected to the communication system 200 by a communication line RT2. The terminal device 30-2 is connected to the communication system 200 by a communication line RT3.

As illustrated in FIG. 6, first, the delivery source device 220 starts recording the streaming data (step S101). The delivery source device 220 records the streaming data, such as a lecture or presentation given by the distributor PU, using the connected microphone 230 and a built-in camera (not shown).

Next, the delivery source device 220 transmits the recorded streaming data to the communication system server 210 (step S102). The delivery source device 220 transmits the recorded streaming data to the communication system server 210 in real time.

Next, the communication system server 210 delivers the streaming data to the terminal device 20 and the terminal device 30 (30-1 and 30-2) (step S103).

The terminal device 20 starts playing back the streaming data delivered from the communication system server 210 (step S104). The communication processing unit 261 receives the streaming data over the communication line RT1, causes the display unit 23 to display a video signal based on the received streaming data, and causes the speaker 25 to output a sound signal based on the streaming data.

The terminal device 30-1 starts playing back the streaming data delivered from the communication system server 210 (step S105). The communication processing unit 361 of the terminal device 30-1 receives the streaming data over the communication line RT2, causes the display unit 33 to display a video signal based on the received streaming data, and causes the speaker 35 to output a sound signal based on the streaming data.

The terminal device 30-2 starts playing back the streaming data delivered from the communication system server 210 (step S106). The communication processing unit 361 of the terminal device 30-2 receives the streaming data over the communication line RT2, causes the display unit 33 to display a video signal based on the received streaming data, and causes the speaker 35 to output a sound signal based on the streaming data.

Next, the terminal device 20 transmits the designation of the sound data to the app host device 10 (step S107). The app processing unit 262 of the terminal device 20 transmits the designation of the sound data, such as applause, to the app host device 10 in response to the user AU1 operating the input unit 22.

Additionally, the terminal device 30-1 transmits the designation of the sound data to the app host device 10 (step S108). The app processing unit 362 of the terminal device 30-1 transmits the designation of the sound data, such as applause, to the app host device 10 in response to the user AU2 operating the input unit 22.

Additionally, the terminal device 30-2 transmits the designation of the sound data to the app host device 10 (step S109). The app processing unit 362 of the terminal device 30-2 transmits the designation of the sound data, such as applause, to the app host device 10 in response to the user AU3 operating the input unit 22.

Next, the app host device 10 executes processing for receiving the sound data (step S110). The sound data receiving unit 131 of the app host device 10 receives the sound data designated by the terminal device 20 (the first sound data) and the sound data designated by the terminal device 30-1 and the terminal device 30-2 (the second sound data). When the designation of the sound data is received, the sound data receiving unit 131 stores the date/time, the terminal information, and the sound data name in the history information storage unit 122 in association with each other.

Next, the sound data receiving unit 131 of the app host device 10 transmits the designated sound signal to the terminal device 20 (step S111). The sound data receiving unit 131 obtains the sound data designated by the terminal device 20 from the sound data storage unit 121, and transmits the designated sound signal that is based on the obtained sound data to the terminal device 20. Through this, the app processing unit 262 of the terminal device 20 outputs the received designated sound signal to the speaker 25 (see FIG. 5).

Additionally, the sound data receiving unit 131 of the app host device 10 transmits the designated sound signal to the terminal device 30-1 (step S112). The sound data receiving unit 131 obtains the sound data designated by the terminal device 30-1 from the sound data storage unit 121, and transmits the designated sound signal that is based on the obtained sound data to the terminal device 30-1. Through this, the app processing unit 362 of the terminal device 30-1 outputs the received designated sound signal to the speaker 35 (see FIG. 5).

Additionally, the sound data receiving unit 131 of the app host device 10 transmits the designated sound signal to the terminal device 30-2 (step S113). The sound data receiving unit 131 obtains the sound data designated by the terminal device 30-2 from the sound data storage unit 121, and transmits the designated sound signal that is based on the obtained sound data to the terminal device 30-2. Through this, the app processing unit 362 of the terminal device 30-2 outputs the received designated sound signal to the speaker 35 (see FIG. 5).

Next, the app host device 10 mixes all the designated sound signals (step S114). The signal processing unit 132 of the app host device 10 obtains all the designated sound data names from the history information storage unit 122, and obtains all the sound data corresponding to all the obtained sound data names from the sound data storage unit 121. The signal processing unit 132 generates the mixed sound signal (the third sound signal) by mixing the sound signals that are based on all the obtained sound data.

Figure 7:
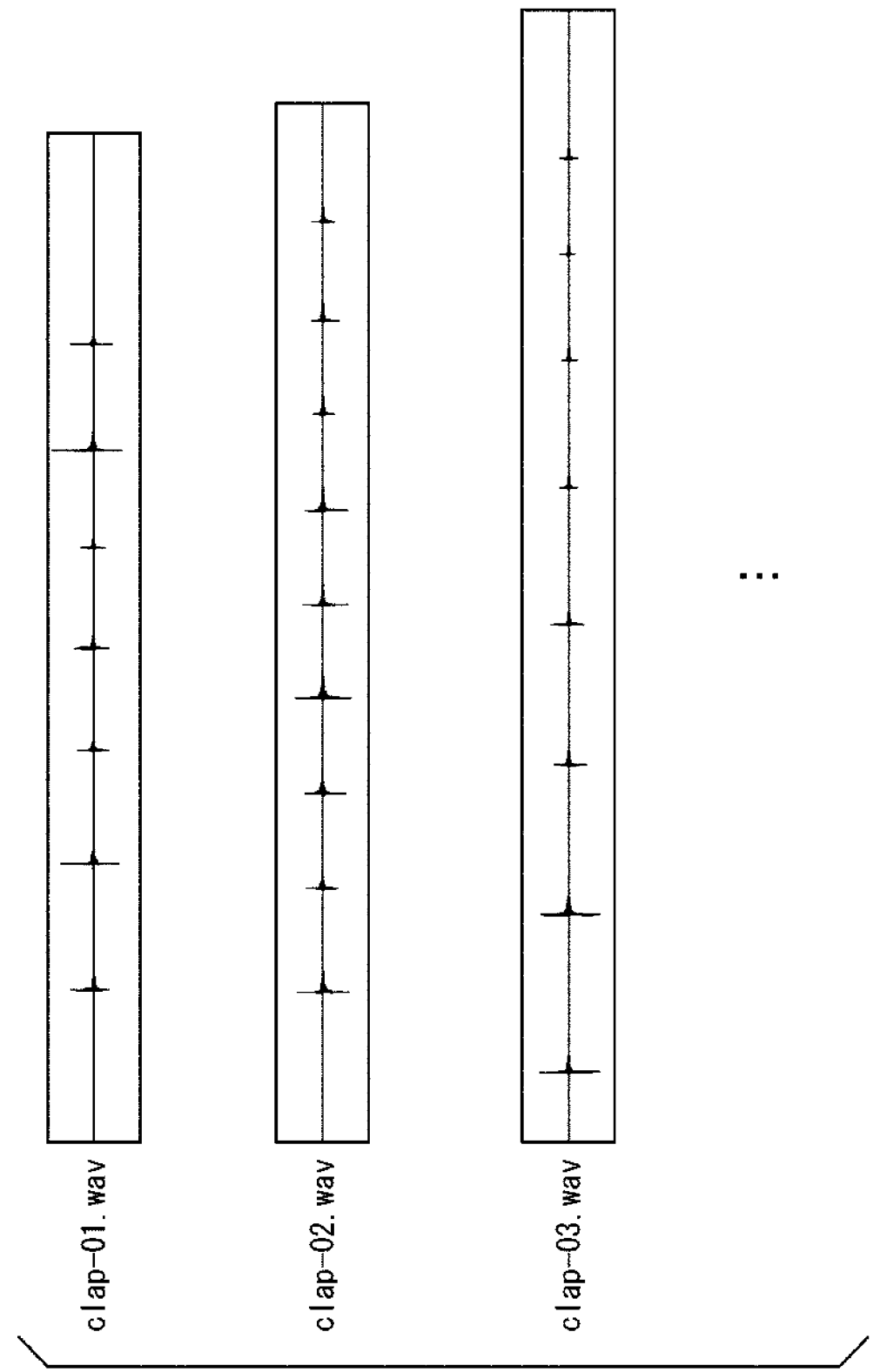
FIG. 7 is a diagram illustrating an example of designated sound data according to Embodiment 1.

For example, assume that the terminal device 20 designates the sound data of "clap-01.wav", the terminal device 30-1 designates the sound data of "clap-02.wav", and the terminal device 30-2 designates the sound data of "clap-03.wav". In this case, the signal processing unit 132 generates the sound signals "clap-01.wav", "clap-02.wav", and "clap-03.wav", such as those illustrated in FIG. 7, and generates a mixed sound signal such as that illustrated in FIG. 8 by mixing those sound signals.

Figure 8:
FIG. 8 is a diagram illustrating an example of a mixed sound signal in which designated sound data is intermixed, according to Embodiment 1.

The signal processing unit 132 may generate the mixed sound signal as a mono sound signal as illustrated in FIG. 8, or as a stereo sound signal. The signal processing unit 132 also executes the mixing processing in real time at predetermined intervals (e.g., 0.5-second intervals), for example. When a plurality of pieces of identical sound data are designated at the same time, the signal processing unit 132 may generate sound signals by shifting the identical sound data by a predetermined period and then generate the mixed sound signal, or may generate sound signals by converting the tempos of the identical sound data and then generate the mixed sound signal.

Returning to the description of FIG. 6, the app host device 10 transmits the mixed sound signal to the terminal device 20 (step S115). The NW communication unit 11 of the app host device 10 transmits the mixed sound signal generated by the signal processing unit 132 to the terminal device 20 to enable the mixed sound signal to be transmitted from the terminal device 20 to the communication system 200 over the communication line RT1.

Next, the terminal device 20 mixes the received mixed sound signal with a microphone input signal (an input sound signal) (step S116). As illustrated in FIG. 5, the communication processing unit 261 of the terminal device 20 includes a mixing unit 263 (an example of a mixing unit), and by mixing the mixed sound signal received from the app host device 10 (the third sound signal) with the input sound signal collected by the microphone 24 (a fourth sound signal), the mixing unit 263 generates a mixed sound signal (a fifth sound signal). Note that when there is no sound signal input from the microphone 24, the mixing unit 263 outputs the mixed sound signal (the third sound signal) received from the app host device 10.

Note also that the terminal device 20 may be configured not to mix signals with the input sound signal collected by the microphone 24 (the fourth sound signal). For example, the terminal device 20 may be configured to switch between the sound signal input from the microphone 24 and the mixed sound signal (the third sound signal) using a switch.

Next, the terminal device 20 transmits the mixed sound signal to the communication system server 210 (step S117). In other words, the communication processing unit 261 transmits the mixed sound signal output from the mixing unit 263 (the third sound signal or the fifth sound signal) to the communication system 200 over the communication line RT1. Here, the communication line RT1 is a communication line to which the communication system 200 and the terminal device 20 are connected.

Next, the communication system server 210 transmits the mixed sound signal to the delivery source device 220 (step S118). The communication system server 210 transmits the mixed sound signal received from the terminal device 20 (the third sound signal or the fifth sound signal) to the delivery source device 220.

Next, the delivery source device 220 plays back the received mixed sound signal (step S119). In other words, the delivery source device 220 outputs a mixed sound signal, such as applause designated by the users AU1 to AU3 through the terminal device 20 and the terminal devices 30 (30-1 and 30-2), to the speaker 240.

This makes it possible to convey reactions of the users AU1 to AU3, such as applause, in real time, to the distributor PU who is delivering the lecture, presentation, or the like.

Operations for designating a plurality of pieces of sound data from a single terminal device of the signal processing system 1 according to the present embodiment will be described next with reference to FIG. 9.

Figure 9:
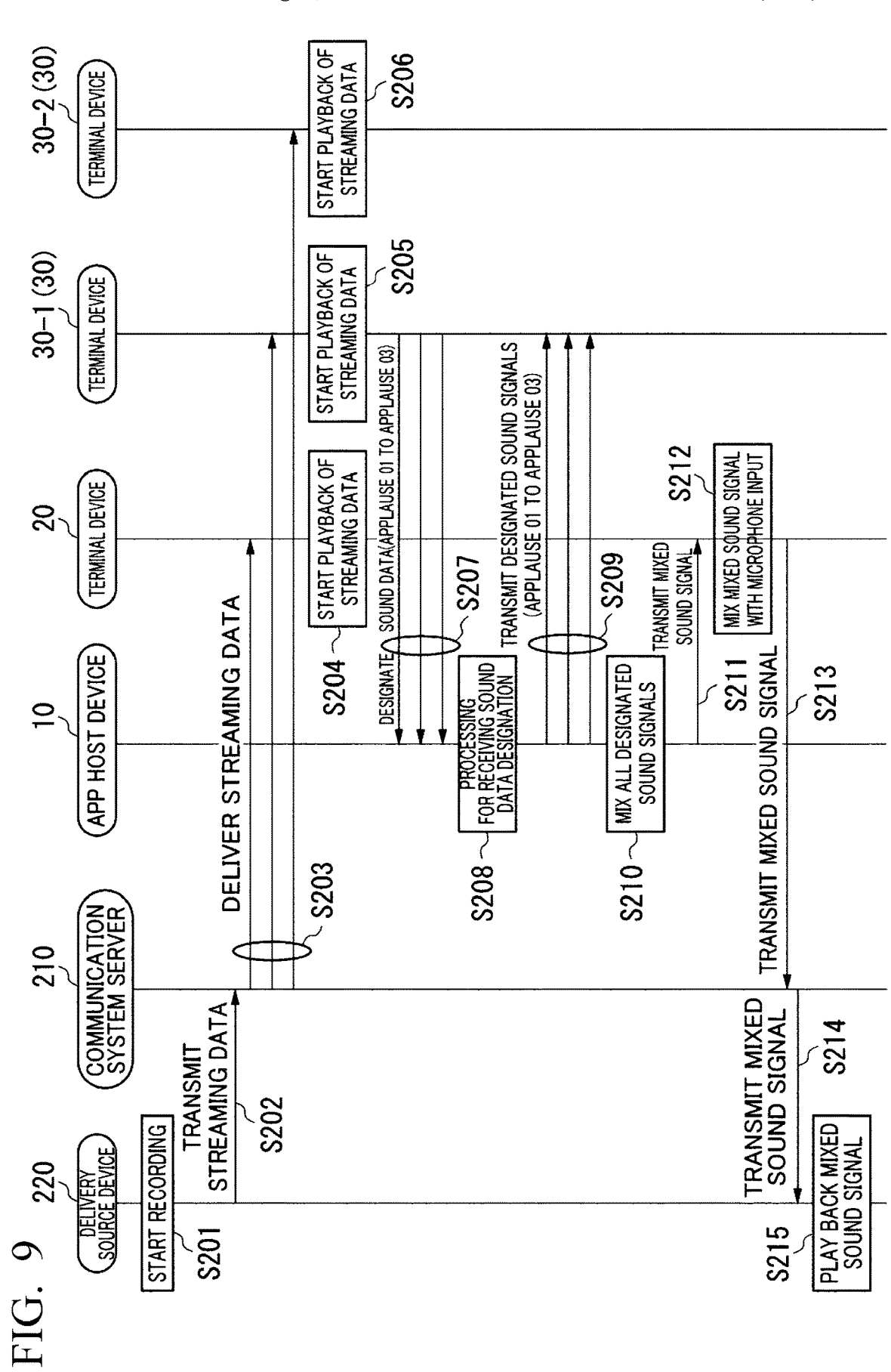
FIG. 9 is a diagram illustrating an example of operations for designating a plurality of pieces of sound data from a single terminal device of the signal processing system according to Embodiment 1.

FIG. 9 is a diagram illustrating an example of operations for designating a plurality of pieces of sound data from a single terminal device of the signal processing system 1 according to the present embodiment.

In FIG. 9, the processing from step S201 to step S206 is similar to the processing from step S101 to step S106 described above with reference to FIG. 6, and will therefore not be described here.

In step S207, the terminal device 30-1 transmits a plurality of designations of sound data to the app host device 10. The app processing unit 362 of the terminal device 30-1 transmits designations of three pieces of sound data, such as "applause 01" to "applause 03", for example, to the app host device 10 in response to the user AU2 operating the input unit 22.

Next, the app host device 10 executes processing for receiving the sound data (step S208). The sound data receiving unit 131 of the app host device 10 receives three pieces of sound data designated by the terminal device 30-1 (the second sound data). When the designations of the three pieces of sound data are received, the sound data receiving unit 131 stores the date/time, the terminal information, and the sound data names (e.g., "applause 01" to "applause 03") in the history information storage unit 122 in association with each other, as illustrated in FIG. 3.

Next, the sound data receiving unit 131 of the app host device 10 transmits the three designated sound signals to the terminal device 20 (step S209). The sound data receiving unit 131 obtains the three pieces of sound data designated by the terminal device 30-1 (e.g., "applause 01" to "applause 03") from the sound data storage unit 121, and transmits the three designated sound signals that are based on the obtained three pieces of sound data to the terminal device 30-1. Through this, the app processing unit 362 of the terminal device 30-1 outputs the received three designated sound signals to the speaker 25.

Next, the app host device 10 mixes all the designated sound signals (step S210). The signal processing unit 132 of the app host device 10 obtains all three designated sound data names from the history information storage unit 122, and obtains the three pieces of sound data corresponding to the three obtained sound data names from the sound data storage unit 121. The signal processing unit 132 generates the mixed sound signal (the third sound signal) by mixing the three sound signals that are based on the three obtained pieces of sound data.

Next, the app host device 10 transmits the mixed sound signal to the terminal device 20 (step S211). The processing from step S211 to step S215 is similar to the processing from step S115 to step S119 described above with reference to FIG. 6, and will therefore not be described here. In step S119, the delivery source device 220 outputs, to the speaker 240, the mixed sound signal of the three pieces of sound data designated by the user AU2 (e.g., "applause 01" to "applause 03") through the terminal device 30-1.

As described above, the signal processing system 1 according to the present embodiment is a system that is connected to a plurality of devices including at least the terminal device 20 (a first terminal device) and the terminal device 30 (a second terminal device), which receive streaming data, and to the communication system 200, which is capable of communicating with the plurality of devices, and that includes the sound data receiving unit 131 (a receiving unit), the signal processing unit 132, and the NW communication unit 11 (a transmission unit). The sound data receiving unit 131 receives a designation of first sound data obtained from the terminal device 20 that has received the streaming data, and a designation of second sound data obtained from the terminal device 30 that has received the streaming data. The signal processing unit 132 obtains the first sound data and the second sound data, and generates a third sound signal (a mixed sound signal) in which a first sound signal based on the first sound data and a second sound signal based on the second sound data are mixed. The NW communication unit 11 transmits the third sound signal to the communication system 200 over the communication line RT1 to which the communication system 200 and the terminal device 20 are connected. Note that the transmission unit may be the communication processing unit 261 or the NW communication unit 21 instead of the NW communication unit 11.

According to this configuration, in the signal processing system 1 according to the present embodiment, the third sound signal (the mixed sound signal), in which the first sound signal based on the first sound data designated by the terminal device 20 and the first sound signal based on the second sound data designated by the terminal device 30 are mixed, is transmitted to the communication system 200 by the sound data receiving unit 131 over the communication line RT1 to which the terminal device 20 is connected. Accordingly, in the signal processing system 1 according to the present embodiment, sound data (such as applause or the like) designated by the terminal device 20 and the terminal device 30 can be transmitted by the terminal device 20 from a single location, together with sound data designated by other terminal devices, to the delivery source of streaming data or the like, for example, without changing the existing communication system 200. This enables the signal processing system 1 according to the present embodiment to convey users' reactions to the streaming data. As such, with the signal processing system 1 according to the present embodiment, when delivering streaming data, the reactions of users on the delivery destination side can be known appropriately. The signal processing system 1 according to the present embodiment can convey an atmosphere of applause in a realistic manner to the delivery source of the streaming data (e.g., the distributor PU), for example.

Additionally, in the signal processing system 1 according to the present embodiment, the sound signals based on the designated sound data are mixed and transmitted by the sound data receiving unit 131, and thus feedback, echoing, and the like can be suppressed, unlike the input from the microphones (24 and 34).

Additionally, the signal processing system 1 according to the present embodiment includes the mixing unit 263 (the mixing unit) that generates a fifth sound signal (a mixed sound signal) by mixing a fourth sound signal (an input sound signal) collected by the microphone 24 (a sound collecting unit) connected to the terminal device 20 with the third sound signal (the mixed sound signal). The NW communication unit 11 causes the fifth sound signal (the mixed sound signal) to be transmitted with the delivery source (e.g., the delivery source device 220) of the streaming data of the communication system 200 serving as a delivery destination side. Note that the mixing unit 263 may be included in the signal processing unit 132. In other words, the signal processing unit 132 may generate the fifth sound signal by mixing the fourth sound signal collected by the microphone 24 (the sound collecting unit) connected to the terminal device 20 with the third sound signal, and the communication processing unit 261 or the NW communication unit 21 (an example of the transmission unit) may then transmit the fifth sound signal to the delivery source of the streaming data of the communication system 200.

Through this, the signal processing system 1 according to the present embodiment can mix the microphone input (the fourth sound signal) and the designated sound data (the first sound signal and the second sound signal) and transmit the resulting signal over the single communication line RT1, and can convey the users' reactions to the streaming data in real time to the delivery source (e.g., the delivery source device 220).

Additionally, in the present embodiment, when the sound data receiving unit 131 has received the designation of an overlapping plurality of pieces of sound data from the same terminal device among the terminal device 20 and the terminal device 30, the signal processing unit 132 generates the third sound signal (the mixed sound signal) in which a plurality of sound signals that are based on the designated plurality of pieces of sound data are mixed.

Through this, the signal processing system 1 according to the present embodiment can mix a plurality of sound signals that are based on a plurality of pieces of sound data designated by a single terminal device (the terminal device 20 or the terminal device 30) and transmit the resulting signal to the delivery source of the streaming data, which makes it possible to more realistically convey the users' reactions to the streaming data, such as applause, and provide a sense of immersion.

Additionally, the signal processing system 1 according to the present embodiment includes the sound data storage unit 121 that stores sound data that can be designated by the sound data receiving unit 131 (see FIG. 2). The signal processing unit 132 obtains the first sound data and the second sound data from the sound data storage unit 121.

Through this, by storing various sound data in the sound data storage unit 121, the signal processing system 1 according to the present embodiment can transmit sound signals based on the various sound data to the delivery source of the streaming data, which makes it possible to transmit, to the delivery source of the streaming data, a variety of user reactions based on the circumstances.

In addition, when a designation of sound data is received, the sound data receiving unit 131 obtains the designated sound data, transmits a designated sound signal based on the designated sound data obtained to the terminal device, among the terminal device 20 and the terminal device 30, that is the source of the designation, and causes the terminal device that is the source of the designation to output the designated sound signal.

Through this, the signal processing system 1 according to the present embodiment can confirm the designated sound data using the sound signal in the terminal device that made the designation.

In addition, in the present embodiment, the sound data receiving unit 131 causes the terminal device 20 and the terminal device 30 to display the designation menu image G1 (an image of a designation menu screen), which includes sound data information indicating the sound data that can be designated, and a playback bar that indicates the playback time of the sound data in a visual manner and has a length corresponding to the playback time (see FIG. 4).

Through this, in the signal processing system 1 according to the present embodiment, a user can select sound data taking into account the playback time of the sound data. Accordingly, the signal processing system 1 according to the present embodiment can improve the convenience for the user.

Embodiment 2

A signal processing system 1*a* according to Embodiment 2 will be described next. Embodiment 2 differs from Embodiment 1 in that the functions of the app host device 10 in Embodiment 1 are divided between an app host device 10*a* and an app processing device 40.

Figure 10:
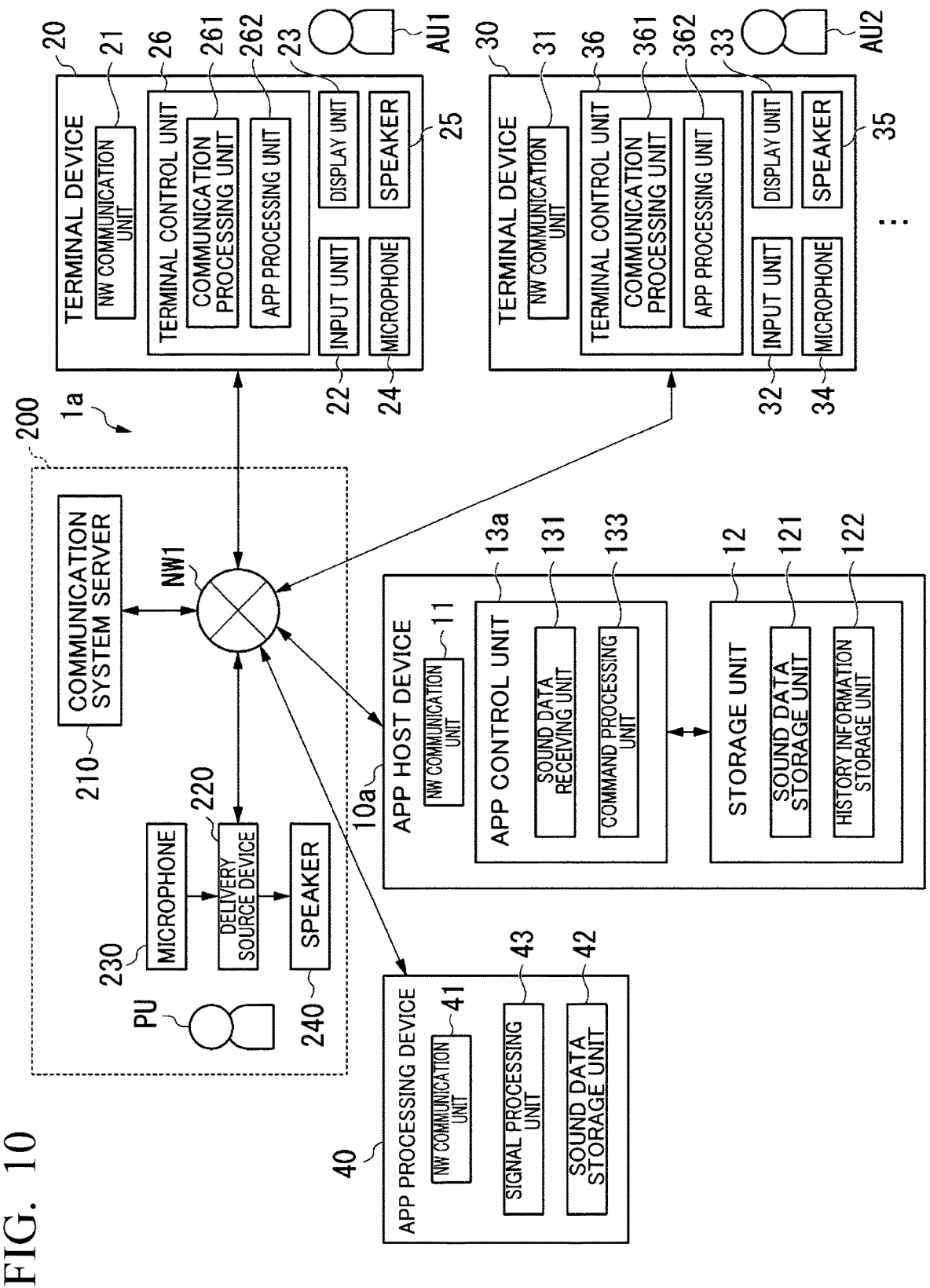
FIG. 10 is a block diagram illustrating an example of a signal processing system according to Embodiment 2.

FIG. 10 is a block diagram illustrating an example of the signal processing system 1*a* according to the present embodiment.

The signal processing system 1*a* is a system that is connected to a communication system 200 and to a plurality of devices including at least a terminal device 20 and a terminal device 30, and includes the app host device 10*a* and the app processing device 40.

In FIG. 10, configurations identical to those in FIG. 1 described above are given identical reference signs, and will not be described.

The app host device 10*a* is a server device connected to the network NW1, and is a web server providing a web site for designating sound data such as applause, for example. The app host device 10*a* receives a designation of sound data such as applause, for example, from the terminal device 20 and the terminal device 30, using a web site through which the sound data is designated. When the sound data receiving unit 131 receives the designation of the first sound data from the terminal device 20 or the designation of the second sound data from the terminal device 30, the app host device 10*a* generates a command indicating that the first sound data or the second sound data has been designated, and transmits the command to the app processing device 40, which will be described later.

The app host device 10*a* includes the NW communication unit 11, the storage unit 12, and an app control unit 13*a*.

The app control unit 13*a* is, for example, a processor including a CPU and the like, and controls the app host device 10*a*. The app control unit 13*a* includes the sound data receiving unit 131 and a command processing unit 133.

When the sound data receiving unit 131 receives the designation of the first sound data from the terminal device 20 or the designation of the second sound data from the terminal device 30, the command processing unit 133 generates a command indicating that the first sound data or the second sound data has been designated. The command processing unit 133 generates a command that includes information indicating the designated sound data (e.g., a sound data name or the like) based on the information stored in the history information storage unit 122, for example. The command processing unit 133 transmits the generated command to the app processing device 40 through the NW communication unit 11.

The app processing device 40 obtains the designated sound data and generates a mixed sound signal (a third signal) in which sound signals based on the obtained sound data are mixed. The app processing device 40 obtains the designated sound data (e.g., the first sound data and the second sound data) based on the command generated by the command processing unit 133 of the app host device 10*a* described above, and generates the mixed sound signal (the third signal) by mixing sound signals based on the obtained sound data (e.g., the first sound signal and the second sound signal).

The app processing device 40 includes an NW communication unit 41, a sound data storage unit 42, and a signal processing unit 43.

The NW communication unit 41 (an example of a transmission unit) is an interface unit that can connect to the network NW1, and performs communication between the app host device 10*a* and the terminal device 20 over the network NW1. The NW communication unit 41 transmits the mixed sound signal (the third sound signal) to the communication system 200 over the communication line RT1 to which the communication system 200 and the terminal device 20 are connected.

Like the sound data storage unit 121, the sound data storage unit 42 stores the sound data name and the sound data in association with each other.

Based on the command received from the app host device 10*a*, the signal processing unit 43 obtains, from the sound data storage unit 42, the sound data for which the sound data receiving unit 131 received the designation from the terminal device 20 and the terminal device 30, and generates the mixed sound signal by mixing the sound signals that are based on the designated plurality of pieces of sound data. For example, the signal processing unit 43 obtains the first sound data designated by the terminal device 20 and the second sound data designated by the terminal device 30 from the sound data storage unit 121, and generates a mixed sound signal (a third sound signal) in which a first sound signal based on the first sound data and a second sound signal based on the second sound data are mixed.

Additionally, based on the command received from the app host device 10*a*, when the sound data receiving unit 131 has received the designation of an overlapping plurality of pieces of sound data from the same terminal device among the terminal device 20 and the terminal device 30, the signal processing unit 43 generates a mixed sound signal (the third sound signal) in which a plurality of sound signals that are based on the designated plurality of pieces of sound data are mixed.

The signal processing unit 43 transmits the generated mixed sound signal (the third sound signal) to the terminal device 20 through the NW communication unit 41, and causes the mixed sound signal (the third sound signal) to be transmitted to the communication system 200 over the communication line RT1 to which the communication system 200 and the terminal device 20 are connected. In other words, the NW communication unit 41 transmits the mixed sound signal (the third sound signal) to the communication system 200 over the communication line RT1 to which the communication system 200 and the terminal device 20 are connected.

Operations by the signal processing system 1*a* according to the present embodiment will be described next with reference to FIG. 11.

Figure 11:
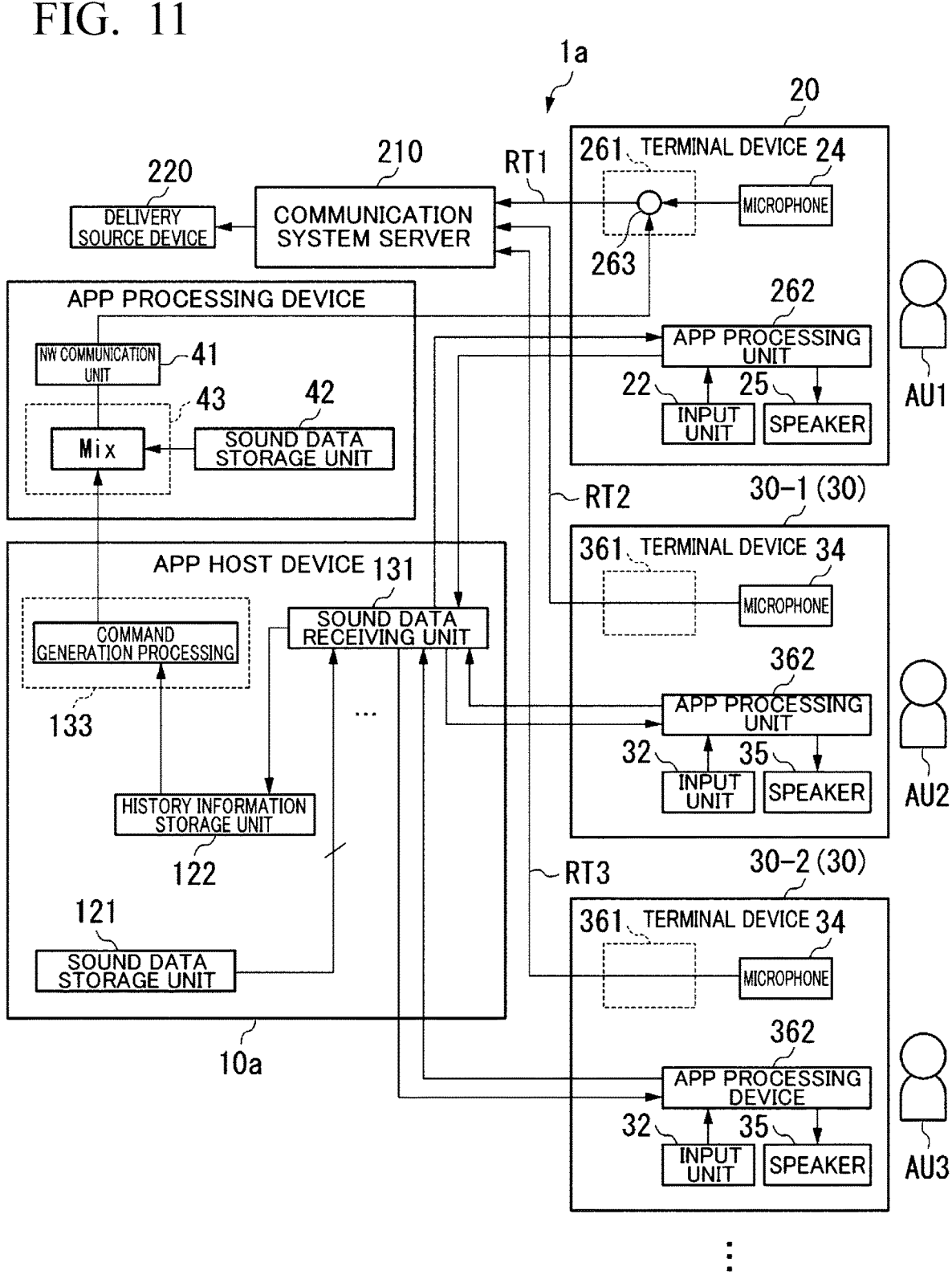
FIG. 11 is a diagram illustrating an example of operations by the signal processing system according to Embodiment 2.

In FIG. 11, the operations by the app host device 10*a* and the app processing device 40 differ from those in Embodiment 1. The operations of the other configurations are similar to those in Embodiment 1, illustrated in FIG. 5.

The command processing unit 133 of the app host device 10*a* generates a command that includes information indicating the designated sound data (e.g., a sound data name or the like) based on the information stored in the history information storage unit 122, for example. The command processing unit 133 transmits the generated command to the app processing device 40 through the NW communication unit 11.

In addition, the signal processing unit 43 of the app processing device 40 obtains the designated sound data from the sound data storage unit 42 based on the command received from the app host device 10*a*, and generates a mixed sound signal in which sound signals based on the obtained sound data are mixed. Then, the NW communication unit 41 transmits the generated mixed sound signal to the terminal device 20, and causes the mixed sound signal (the third sound signal) to be transmitted to the communication system server 210 over the communication line RT1.

Figure 12:
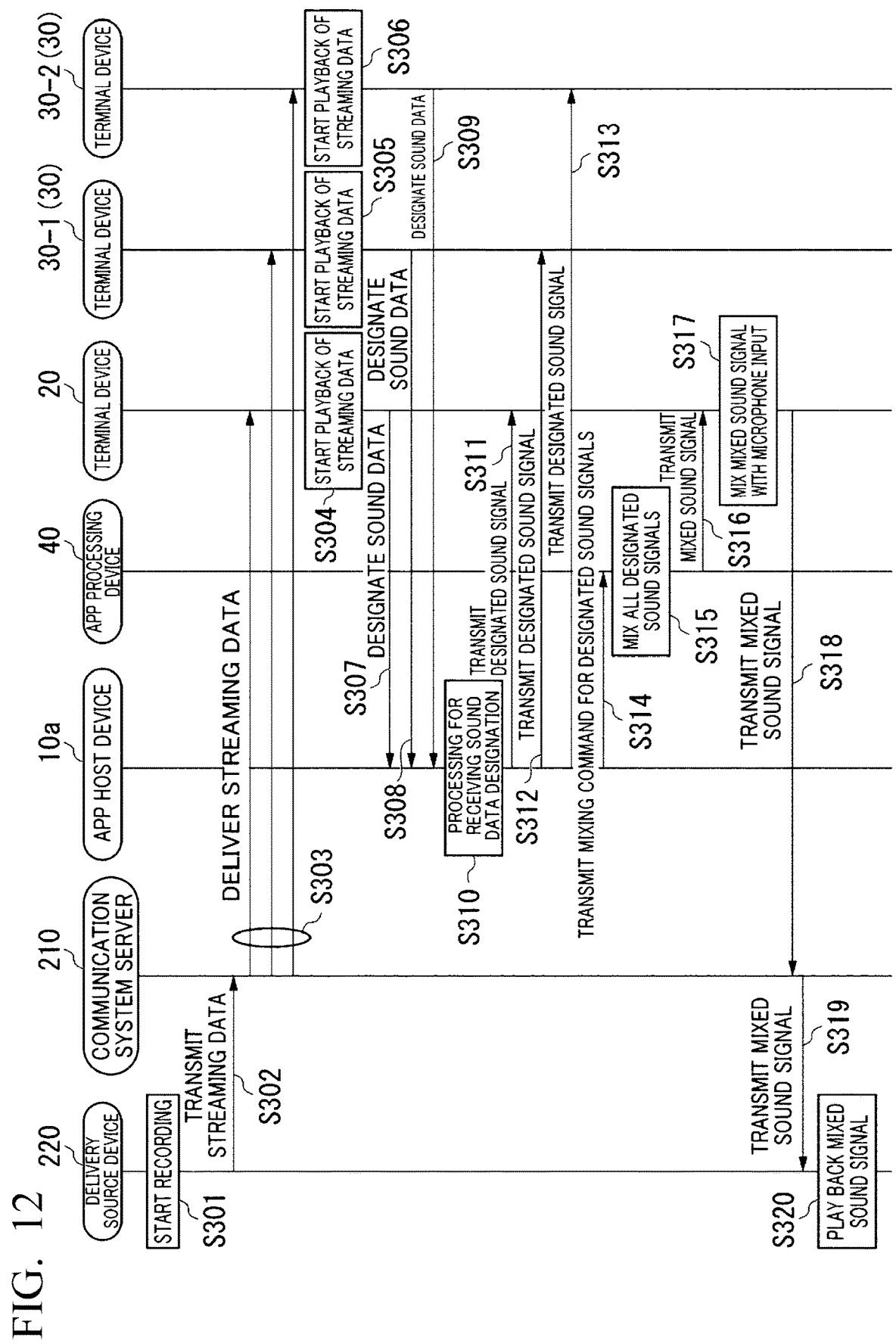
FIG. 12 is a diagram illustrating an example of operations for designating sound data from a plurality of terminal devices of the signal processing system according to Embodiment 2.

FIG. 12 is a diagram illustrating an example of operations for designating sound data from a plurality of terminal devices (20 and 30) of the signal processing system 1*a*.

In FIG. 12, the processing from step S301 to step S313 is similar to the processing from step S101 to step S113 described above with reference to FIG. 6, and will therefore not be described here.

Next, in step S314, the app host device 10*a* transmits a command to mix the designated sound signals. Based on the information stored in the history information storage unit 122, the command processing unit 133 of the app host device 10*a* generates a command including sound data names corresponding to the sound data designated by the terminal device 20, the terminal device 30-1, and the terminal device 30-2, respectively, as a command to mix the designated sound signals, for example. The command processing unit 133 transmits the generated command to the app processing device 40 through the NW communication unit 11.

Next, the app processing device 40 mixes all the designated sound signals (step S315). Based on the received command, the signal processing unit 43 of the app processing device 40 obtains all the sound data corresponding to all the designated sound data names from the sound data storage unit 42. The signal processing unit 43 generates the mixed sound signal (the third sound signal) by mixing the sound signals that are based on all the obtained sound data.

Next, the app processing device 40 transmits the mixed sound signal to the terminal device 20 (step S316). The NW communication unit 41 of the app processing device 40 transmits the mixed sound signal generated by the signal processing unit 43 to the terminal device 20 to enable the mixed sound signal to be transmitted from the terminal device 20 to the communication system 200 over the communication line RT1.

The subsequent processing from step S317 to step S320 is similar to the processing from step S116 to step S119 described above with reference to FIG. 6, and will therefore not be described here.

As described above, the signal processing system 1*a* according to the present embodiment includes the app host device 10*a* (a server device) and the app processing device 40. The app host device 10*a* includes the sound data receiving unit 131, and generates a command indicating that the first sound data or the second sound data has been designated when the sound data receiving unit 131 receives the designation of the first sound data or the designation of the second sound data. The app processing device 40 also includes the signal processing unit 43 and the NW communication unit 41 (a transmission unit). The signal processing unit 43 obtains the command generated by the app host device 10*a*, and, based on the obtained command, obtains the first sound data designated by the terminal device 20 and the second sound data designated by the terminal device 30, and generates a mixed sound signal (a third sound signal) in which the first sound signal based on the first sound data and the second sound signal based on the second sound data are mixed. The NW communication unit 41 transmits the mixed sound signal (the third sound signal) to the communication system 200 over the communication line RT1 to which the communication system 200 and the terminal device 20 are connected.

Through this, the signal processing system 1a according to the present embodiment provides the same effects as the signal processing system 1 according to Embodiment 1 described above, and makes it possible to appropriately know the reactions of users on the delivery destination side when streaming data is delivered. Additionally, in the signal processing system 1a according to the present embodiment, the processing load on the app host device 10a can be lightened by the app host device 10a generating the command and dividing the processing with the app processing device 40.

Note that the present disclosure is not limited to the foregoing embodiments, and can be changed without departing from the essential spirit of the present disclosure.

For example, the foregoing embodiments described an example in which the signal processing system 1 (1a) includes the sound data storage unit 121 (42) and obtains the sound data from the sound data storage unit 121 (42), but the present disclosure is not limited thereto, and for example, the sound data may be obtained from an external file server or the like.

The foregoing Embodiments 1 and 2 described examples in which the terminal device 20 includes the mixing unit 263, but the present disclosure is not limited thereto, and the mixing unit 263 may be provided outside the terminal device 20. The signal processing system 1 (1a) may include the mixing unit 263 as part of the signal processing unit 132 (43), or may lack the mixing unit 263 altogether.

Additionally, the foregoing Embodiments 1 and 2 described an example in which the terminal device 20 that receives the streaming data transmits the mixed sound signal to the communication system 200, but for example, a dedicated terminal that does not receive the streaming data may transmit the mixed sound signal to the communication system 200. Additionally, an account (e.g., a predetermined user ID) that receives the streaming data in the communication system 200 may be used to transmit the mixed sound signal directly from the app host device 10 or the app processing device 40 to the communication system 200.

In addition, the foregoing embodiments described an example in which the signal processing system 1 (1a) generates a mono sound signal when generating the mixed sound signal of the designated sound signals, but the present disclosure is not limited thereto, and for example, a multichannel signal such as a stereo sound signal may be generated. In this case, the signal processing system 1 (1a) may cause the sound image of the sound signal such as applause to be localized for each user ID, for example. Additionally, the signal processing system 1 (1a) may associate user IDs of users participating in a meeting with a conference room ID and adjust the sound field based on the conference room ID.

In addition, the foregoing embodiments described an example in which the signal processing system 1 (1a) simply mixes the sound signals when generating the mixed sound signal of the designated sound signals, but the present disclosure is not limited thereto, and the mixed sound signal may instead be generated by, for example, performing tempo conversion, tone conversion using an equalizer, changing the volume, changing the pan, applying an acoustic effect such as reverb, replacing sound signals with multiperson sound signals created in advance, or the like.

Additionally, the foregoing embodiments described an example in which the app host device 10 (10a) transmits the designated sound signals to the terminal devices (20 and 30) when the designation of the sound data is received, as in step S111 to step S113 in FIG. 6, for example, but the app host device 10 (10a) may transmit the sound data in advance when each terminal device (20 and 30) launches an app.

Note that each element provided in the signal processing system 1 (1a) described above has a computer system therein. A processing sequence for each element provided in the signal processing system 1 (1a) described above is stored in a computer-readable recording medium in the form of a program, and the above-described processing is performed by the computer reading out and executing the program. Here, "computer-readable recording medium" refers to a magnetic disk, a magneto-optical disk, a CD-ROM, a DVD-ROM, a semiconductor memory, or the like. Additionally, the computer program may be delivered to the computer over a communication line, and the computer to which the program has been delivered may then execute the program.

According to the present disclosure, when delivering streaming data, reactions of a user on a delivery destination side can be known appropriately.

What is claimed is:

1. A signal processing system in which a plurality of devices including at least a first terminal device and a second terminal device that receive streaming data are connected to a communication system capable of communicating with the plurality of devices, the signal processing system comprising:
   a designation menu screen display unit that causes each of the first terminal device and the second terminal device to display a designation menu screen including an image;
   a receiving unit that receives, by a designation of the image displayed on the designation menu screen, a designation of first sound data from the first terminal device that received the streaming data and a designation of second sound data from the second terminal device that received the streaming data;
   a signal processing unit that obtains first sound data corresponding to the received designation of first sound data and second sound data corresponding to the received designation of second sound data, and generates a third sound signal in which a first sound signal corresponding to the first sound data and a second sound signal corresponding to the second sound data are mixed; and
   a transmission unit that transmits the third sound signal to the communication system via a communication path connecting the communication system and the first terminal device.

2. The signal processing system according to claim 1, wherein the first terminal device receives the third sound signal from the transmission unit and generates a fifth sound signal by mixing a fourth sound signal collected by a sound collecting unit connected to the first terminal device with the third sound signal, and
   the first terminal device transmits the fifth sound signal to a source of the streaming data of the communication system.

3. The signal processing system according to claim 1, wherein in a case where the receiving unit receives a designation of an overlapping plurality of pieces of sound data from a same terminal device among the first terminal device and the second terminal device, the signal processing unit generates the third sound signal in which a plurality of sound signals corresponding to the designated plurality of pieces of sound data are mixed.

4. The signal processing system according to claim 1, further comprising:
a sound data storage unit that stores sound data in association with a designation of the stored sound data,
wherein the signal processing unit obtains the first sound data and the second sound data from the sound data storage unit based on the received designation of first sound data and the received designation of second sound data, respectively.

5. The signal processing system according to claim 1, wherein in a case where a designation of sound data is received, the receiving unit obtains sound data corresponding to the received designation of sound data, transmits a sound signal corresponding to the obtained sound data to a terminal device, among the first terminal device and the second terminal device, that is a source of the received designation of sound data, and causes the terminal device that is the source of the received designation of sound data to output the transmitted sound signal.

6. The signal processing system according to claim 1, further comprising:
a server device that includes the receiving unit and that, in a case where the receiving unit has received the designation of the first sound data and the designation of the second sound data, generates commands respectively indicating that the first sound data and the second sound data have been designated,
wherein the signal processing unit obtains the commands generated by the server device, and based on the obtained commands, obtains the first sound data and the second sound data and generates the third sound signal in which the first sound signal corresponding to the first sound data and the second sound signal corresponding to the second sound data are mixed.

7. The signal processing system according to claim 1, wherein the image displayed on the designation menu screen includes sound data information indicating sound data that can be designated, and a playback bar having a length corresponding to a playback time of the sound data that can be designated.

8. The signal processing system according to claim 1, wherein the image comprises a play back bar indicating a playback time of sound data in a visual manner.

9. The signal processing system according to claim 8, wherein the play back bar has a length corresponding to the playback time.

10. A signal processing device configured to communicate with a plurality of devices including at least a first terminal device and a second terminal device that receive streaming data and that are connected to a communication system capable of communicating with the plurality of devices, the signal processing device comprising:
a designation menu screen display unit that causes each of the first terminal device and the second terminal device to display a designation menu screen including an image;
a receiving unit that receives, by a designation of the image displayed on the designation menu screen, a designation of first sound data from the first terminal device that received the streaming data and a designation of second sound data from the second terminal device that received the streaming data;
a signal processing unit that obtains first sound data corresponding to the received designation of first sound data and second sound data corresponding to the received designation of second sound data, and generates a third sound signal in which a first sound signal corresponding to the first sound data and a second sound signal corresponding to the second sound data are mixed; and
a transmission unit that transmits the third sound signal to the communication system via a communication path connecting the communication system and the first terminal device.

11. A signal processing method for a signal processing system in which a plurality of devices including at least a first terminal device and a second terminal device that receive streaming data are connected to a communication system capable of communicating with the plurality of devices, the signal processing method comprising:
causing each of the first terminal device and the second terminal device to display a designation menu screen including an image;
receiving, by a designation of the image displayed on the designation menu screen, a designation of first sound data from the first terminal device that received the streaming data and a designation of second sound data from the second terminal device that received the streaming data;
obtaining first sound data corresponding to the received designation of first sound data and second sound data corresponding to the received designation of second sound data, and generating a third sound signal in which a first sound signal corresponding to the first sound data and a second sound signal corresponding to the second sound data are mixed; and
transmitting the third sound signal to the communication system via a communication path connecting the communication system and the first terminal device.

* * * * *